United States Patent [11] 3,624,024

[72] Inventors John R. Caldwell;
 Marvin A. McCall, both of Kingsport, Tenn.
[21] Appl. No. 13,789
[22] Filed Feb. 24, 1970
[45] Patented Nov. 30, 1971
[73] Assignee Eastman Kodak Company
 Rochester, N.Y.

[54] FLAME RETARDANT POLY(TETRAMETHYLENE TEREPHTHALATE) MOLDING COMPOSITIONS
 9 Claims, No Drawings
[52] U.S. Cl. .................................................. 260/40 R, 260/DIG. 24
[51] Int. Cl. .................................................. C08g 51/04
[50] Field of Search .................................................. 260/40, 45.85 R, 45.8 R, 45.7 R

[56] References Cited
UNITED STATES PATENTS

| | | | |
|---|---|---|---|
| 3,284,378 | 11/1966 | Roberts | 260/40 X |
| 3,285,965 | 11/1966 | Jenkner | 260/45.7 X |
| 3,519,700 | 7/1970 | Baum | 260/40 R X |

*Primary Examiner*—Lewis T. Jacobs
*Attorneys*—Cecil D Quillen, Jr. and Charles R. Martin

ABSTRACT: Compositions moldable into a self-extinguishing article comprising poly(tetramethylene terephthalate) and a brominated additive.

In a first aspect of the invention, talc is added to the composition, and the article molded from this composition has an unexpectedly high heat distortion temperature. In one embodiment of the first aspect of the invention an antimony containing compound is added to the poly(tetramethylene terephthalate), brominated additive and talc. In this first aspect of the invention the brominated additive comprises brominated diphenyl, brominated diphenyl ether, or brominated diphenyl carbonate.

In a second aspect of the invention antimony trioxide is optionally added to poly(tetramethylene terephthalate) and a brominated additive to provide a composition from which an article can be molded that is increasingly flame retardant and talc is optionally added to the composition to provide an article that has an unexpectedly high heat distortion temperature. In this second aspect of the invention the brominated additive can comprise tetrabromophthalic anhydride, an ester of tetrabromobisphenol A, a tetrabromophthalic imide or a bistetrabromophthalic imide.

FLAME RETARDANT POLY(TETRAMETHYLENE TEREPHTHALATE) MOLDING COMPOSITIONS

This invention relates to compositions moldable into a self-extinguishing article comprising poly(tetramethylene terephthalate), and a brominated additive. In a first aspect, this invention relates to compositions moldable into a self-extinguishing article having a high heat distortion temperature. In this aspect the composition comprises poly(tetramethylene terephthalate), talc and a brominated additive which can be brominated diphenyl, brominated diphenyl ether or brominated diphenyl carbonate. In this aspect of the invention the composition can optionally contain an antimony containing compound. In a second aspect, this invention relates to compositions which can be molded into a self-extinguishing article. In this aspect the composition comprises poly(tetramethylene terephthalate) and a brominated additive which can be tetrabromophthalic anhydride, an ester of tetrabromobisphenol A, a tetrabromophthalic imide or a bis-tetrabromophthalic imide. In one embodiment of the second aspect of the invention an antimony containing compound can be added to produce a composition from which articles of increased flame retardancy can be molded. In another embodiment talc can be added to the composition of the second aspect of the invention to produce a self-extinguishing article that also has an unexpectedly high heat distortion temperature.

The production of molding grade polyester resins which are self-extinguishing and have high resistance to heat is of considerable commercial importance. For instance, molded articles of polyester resins are required to be self-extinguishing for many uses and are also required to endure without deterioration the heat of the molding operation as well as the heat in the environment in which it is used.

A typical illustration of a molded article which must be self-extinguishing and have high-heat resistance is housings for electrical equipment, as these articles must not be ignited by sparks or be deteriorated by heat generated in the electrical equipment. A specific illustration of such articles is housings for small motor driven electrical appliances used in the home, such as mixers, blenders and the like.

In order to provide a self-extinguishing polyester composition a wide variety of additives have been developed; however, in many instances these compositions have properties, particularly heat distortion temperature, that are unsatisfactory for many commercial uses. Thus the prior art fails to provide a composition moldable into an article that is both self-extinguishing and has a high heat distortion temperature.

Specifically, U.S. Pat. No. 3,382,207 discloses a composition of a thermoplastic polymer having an ignition temperature in excess of 700° F. and a polyhalodiphenyl carbonate such as decabromodiphenyl carbonate. This composition is unsuited for use as a plastic to mold many types of articles because of its unsatisfactory heat distortion temperature.

Additionally, British Pat. No. 1,100,605 discloses the composition of a polyester, such as polyethylene terephthalate, a bromine containing diphenyl or diphenyl ether, antimony trioxide and a calcium carbonate filler. This composition is also unsuitable for use as a molding plastic to mold various types of articles due to its undesirable low heat distortion temperature.

Thus, broadly, according to a first aspect of this invention there is provided a composition moldable into a self-extinguishing article having a remarkably high heat distortion temperature. This composition comprises poly(tetramethylene terephthalate), talc, and brominated diphenyl, brominated diphenyl ether, or brominated diphenyl carbonate. In this aspect of the invention an antimony containing compound can be added to this composition.

Also, broadly, according to a second aspect of the invention, there is provided a composition moldable into a self-extinguishing article, wherein this composition comprises poly(tetramethylene terephthalate) and tetrabromophthalic anhydride, an ester of tetrabromobisphenol A, a tetrabromophthalic imide or a bis-tetrabromophthalic imide. In one embodiment of the second aspect of the invention, talc can be added to the poly(tetramethylene terephthalate) and brominated additive to provide a composition moldable into an article having a high heat distortion temperature. In another embodiment of the second aspect of the invention an antimony containing compound can be added to the poly(tetramethylene terephthalate) and brominated additive to provide a composition moldable into an article with increased flame-retardancy characteristics.

Accordingly, it is an object of the first aspect of the invention to provide a polyester composition moldable into a self-extinguishing article with remarkably high heat distortion temperature.

Accordingly it is an object of the second aspect of the invention to provide a composition moldable into a self-extinguishing article. Additionally, it is an object of the second aspect of the evaluation to provide a composition moldable into an article having an unexpectedly high heat distortion temperature.

Other objects, advantages, and features of this invention will be readily apparent to those skilled in the art from the following description, and appended claims.

"Heat distortion temperature" as used in this application and appended claims is the temperature at which 0.2 percent deflection of a 2-inch span of a 1/8-inch bar occurs at 264 p.s.i. as measured in a forced-convection oven as described in Modern Plastics, 34, No. 3, 169 (1956).

When a molded article has a heat distortion temperature of above about 65° C., it is generally regarded as satisfactory for many typical high heat distortion temperature uses.

"Self-extinguishing" as used in this application and appended claims means that the material is incapable of burning or sustaining a flame for more than a short time after it is separated from an open flame in which it has been heated and ignited. In other words, a composition is considered to be self-extinguishing if it stops burning shortly after a flame used to start its burning has been removed or the material is taken out of the flame.

"Oxygen index" as used in this application and appended claims is defined as the minimal volume fraction of oxygen in a slowly rising gaseous atmosphere that will sustain the candle-like burning of a stick of polymer. It is a convenient, reproducible, numerical measure of polymer flammability. When a molded article has an oxygen index of more than about 26, it is generally regarded as self-extinguishing. By comparison, an unmodified poly(tetramethylene terephthalate) molding plastic with an inherent viscosity of 1.63 measured at a concentration of 0.23 g./100 ml. in 60/40 parts by weight phenol/tetrachloroethane at 25° C. has an oxygen index of about 22, and is not self-extinguishing.

The polyesters used in this invention contain 1,4-butanediol and terephthalic acid and are disclosed in Serial Number 867,902 entitled BUTANEDIOL POLYESTER COMPOSITIONS CONTAINING TALC AND HAVING IMPROVED HEAT-DISTORTION TEMPERATURES by Jackson, Caldwell, and Kuhfuss filed Oct. 10, 1969, and Ser. No. 867,929, titled MOLDED ARTICLES OF BUTANEDIOL POLYESTERS by Jackson, Caldwell, and Kuhfuss, filed Oct. 10, 1969. The homopolyester is used in a preferred embodiment but copolyesters can be used which contain, based on the total moles of diol, at least 80 mole percent 1,4-butanediol modified with other diols or mixtures thereof such as 1,4-cyclohexanedimethanol, ethylene glycol, neopentyl glycol, and the like. Additionally, copolyesters can be used which contain, based on the total moles of dicarboxylic acid, at least 80 mole percent terephthalic acid modified with other dicarboxylic acids, or mixtures thereof, such as isophthalic, adipic, naphthalendioic, etc. The polyesters useful in this invention are prepared by conventional methods, such as by ester interchange of the glycol with a dialkyl or diphenyl ester of the dicarboxylic acid.

The inherent viscosity of the polyester used in this invention is such that an article molded from the composition of the invention has properties desirable for its intended use. In one embodiment the inherent viscosity of the polyester is at least 1.2 and preferably at least 1.5 measured at a concentration of 0.23 g. 100 ml in 60/40 parts by weight of phenol/tetrachloroethane at 25° C.

According to the first aspect of this invention, a self-extinguishing high distortion temperature molding composition is provided wherein poly(tetramethylene terephthalate), and talc are combined with a brominated additive which comprises a brominated diphenyl, a brominated diphenyl ether or a brominated diphenyl carbonate corresponding to the general formula

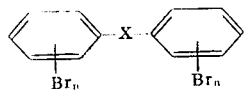

where X is a direct bond, —O —, or $$-O-\overset{O}{\underset{\|}{C}}-O-,$$

and $n$ is 3, 4, or 5. An antimony containing compound can also be added to this composition.

Particularly useful ether derivatives include heptabromodiphenyl ether, hexabromodiphenyl ether, octabromodiphenyl ether, and decabromodiphenyl ether. Particularly useful carbonate derivatives include 2,4,6,2', 4', 6'-hexabromodiphenyl carbonate; 2,3,4,5,6,2', 4'-heptabromodiphenyl carbonate and decabromodiphenyl carbonate. Mixtures of various brominated additives can be used in the first aspect of this invention.

According to the first aspect of the invention, the antimony containing compound can be any compound containing antimony that is useful in the practice of this invention. Specifically, antimony trioxide is preferred but other compounds containing antimony can be used such as antimonates, basic salts, triaryl derivatives and the like In the first aspect of the invention the amount of antimony in the antimony containing compound can comprise, based on the weight of the total composition, from about 1–4 weight percent and in another embodiment can comprise from about 1–3 weight percent.

The amount of talc can comprise, based on the weight of the total composition, from about 5–25 weight percent, and in one embodiment can comprise about 10–15 weight percent.

According to this invention, the brominated additive contains more than about 40 weight percent, and preferably contains from about 50–85 weight percent bromine, based on the weight of the additive including the bromine. The amount of additive that can be used in such that, based on the total weight of the composition, the amount of bromine is from about 3–12 weight percent, and in one specific embodiment the amount of bromine is from about 6–8 weight percent.

The talc useful in this invention is employed in a finely divided form and the particle size may vary widely as, for instance, from about 0.01 to about 1,000 microns, with the preferred particle size being less than about 50 microns. The particle may also assume any naturally existing or desired shape as, for instance, acicular, fibrous, flat platelet, etc.

According to the second aspect of this invention, a self-extinguishing molding composition is provided wherein poly(tetramethylene terephthalate) is combined with a brominated additive which comprises tetrabromophthalic anhydride, an ester of tetrabromobisphenol A, a tetrabromophthalic imide corresponding to the general formula

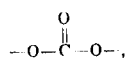

where R is hydrogen or an alkyl group containing from one to four carbon atoms, or a bis-tetrabromophthalic imide corresponding to the general formula

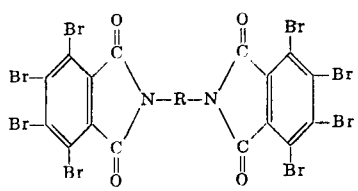

where R is an alkylene group containing from two to ten carbon atoms.

Mixtures of the above additives can be used in the second aspect of this invention.

Those skilled in the art will recognize that an ester of tetrabromobisphenol A indicates an ester of 4,4'-isopropylidenediphenol wherein four bromine atoms are bonded to the phenylene rings.

In the second aspect of the invention, the bromine weight percent requirements of the additive, as well as the bromine weight percent requirements in the total composition are as described with respect to the first aspect. Additionally, the disclosure relating to the talc and antimony containing compound used in the first aspect of the invention is also applicable to the second aspect of the invention.

According to both the first and second aspect of this invention the brominated additives, antimony containing compound, and talc can be incorporated in the polyester by any method which results in a composition which possesses the flame retardancy, and heat distortion temperature characteristics of articles molded from compositions of this invention. For example, these materials, in various physical forms such as powder, granules, etc., can be mixed with pellets of the polyester and the mixture passed through a heated screw-type extruder wherein the polyester is melted. The molten mixture is then extruded as a rod and the rod cut into pellets suitable for molding according to methods well known in the art. It will be recognized that these materials can be incorporated into the polyester in other ways which are apparent to one skilled in the art.

Other additives such as mold release agents, pigments, dyes, fillers, plasticizers, stabilizers and the like can be added to the composition of this invention.

EXAMPLE 1

In order to illustrate one embodiment of the first aspect of the invention a first self-extinguishing blend is prepared according to this invention to illustrate the unexpectedly high heat distortion temperature of articles molded from the second blend. Specifically, the first blend used a control containing poly(tetramethylene terephthalate), decabromodiphenyl ether, antimony trioxide and CaCO₃ and the second blend illustrating this invention contains the same materials as the control but talc is substituted for the CaCO₃. Specific data regarding these blends is given below.

| Components in Blend | Weight in Grams | |
|---|---|---|
| | Blend 1 | Blend 2 |
| Poly(tetramethylene terephthalate) | 78.6 | 78.6 |
| Decabromodiphenyl ether | 8.4 | 8.4 |
| Sb₂O₃ | 3.0 | |
| CaCO₃ | 10.0 | |
| Talc | | 10.0 |

The amount of bromine in Blend 1 and Blend 2 is about 7 percent, based on the total weight of the blend.

Test bars molded from each of these blends indicate both blends have good molding properties. After annealing the test bars for 110°C. for 30 minutes to relieve strains, the heat distortion temperature and flammability of the bars are determined

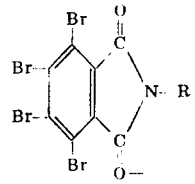

The heat distortion temperature of the test bars is determined as described previously and is presented in the below table.

The flammability of the test bars is quantitatively determined by Oxygen Index determinations using a Type FL 101 General Electric Flammability Index Tester according to procedures well known in the art. The Oxygen Index determination of the bars made from the two blends are presented in the below table and indicate all blends are self-extinguishing.

TABLE

| Blend Number | Additive | Heat Distortion Temperature- °C. | Oxygen Index |
|---|---|---|---|
| 1 | CaCO₃ | 58 | 32.0 |
| 2 | Talc | 71 | 32.9 |

These data indicate that an article molded from a blend of poly(tetramethylene terephthalate), decabromodiphenyl ether, $Sb_2O_3$, and $CaCO_3$ is self-extinguishing due to an oxygen index of 32.0 but has a heat distortion temperature of only 58° C., which is unsatisfactory for many uses. These data additionally indicate that an article molded from a similar blend containing talc in place of $CaCO_3$ is also self-extinguishing due to its high oxygen index of 32.9 but in addition has an unexpectedly high heat distortion temperature of 71° C., which is more than 20 percent higher than the $CaCO_3$ containing blend.

An oxygen index of about 27 is obtained when no antimony is present and the heat distortion temperature of an article molded from this composition is substantially the same as when an antimony containing compound is present.

Similar results are obtained when the antimony is present as sodium antimony, basic antimony chloride, a complex of antimony with a hydroxyacid or triphenyl stibine. Thus, in summary, these data demonstrate that the blend of poly(tetramethylene terephthalate), decabromodiphenyl ether, $Sb_2O_3$, and talc is self-extinguishing and has flammability characteristics similar to a blend containing $CaCO_3$ instead of talc, but the talc containing blend of this invention has an unexpectedly high heat distortion temperature.

EXAMPLE 2

Tetrabromophthalic Anhydride

In order to illustrate one embodiment of the second aspect of the invention, a blend of 90 grams poly(tetramethylene terephthalate) and 10 grams tetrabromophthalic anhydride is prepared and injection molded into an article. This blend contains about 7 percent bromine, based on the total weight of the blend, and an oxygen index of 27 indicates that the molded article is self-extinguishing and well above the oxygen index of unmodified poly(tetramethylene terephthalate) which is about 22.

Another blend containing the following materials is prepared to illustrate one embodiment of the second aspect of the invention wherein poly(tetramethylene terephthalate), tetrabromophthalic anhydride, talc and antimony trioxide are blended to produce a molding composition with an unexpectedly high heat distortion temperature and increased flame retardancy.

| Components in Blend | Weight in Grams |
|---|---|
| Poly(tetramethylene terephthalate) | 72 |
| Tetrabromophthalic anhydride | 10 |
| Talc | 15 |
| Sb₂O₃ | 3 |

The amount of bromine in the blend is about 7 percent, based on the weight of the total blend. An oxygen index of above 27 makes articles molded from this composition desirable for a number of uses requiring self-extinguishing characteristics. A heat distortion temperature above 65° C. make this molding composition desirable for uses requiring a high test distortion temperature.

EXAMPLE 3

ESTER OF TETRABROMOBISPHENOL A

Another blend containing the following materials is prepared to illustrate one embodiment of the second aspect of the invention wherein poly(tetramethylene terephthalate) and an ester of tetrabromobisphenol A are combined to produce a self-extinguishing molding composition.

| Components in Blend | Weight in Grams |
|---|---|
| Poly(tetramethylene terephthalate) | 90 |
| Tetrabromobisphenol A diacetate | 10 |

The amount of bromine in the blend is about 7 percent, based on the weight of the total blend. Good molding properties and an Oxygen Index of more than 27 indicate that articles molded from this composition are self-extinguishing.

Another blend containing the above materials plus antimony trioxide and talc is prepared to illustrate one embodiment of second aspect of the invention wherein high heat distortion temperature molding compositions of increased flame retardance are provided.

| Components in Blend | Weight in Grams |
|---|---|
| Poly(tetramethylene terephthalate) | 77 |
| Tetrabromobisphenol A diacetate | 10 |
| Talc | 10 |
| Sb₂O₃ | 3 |

The amount of bromine in this blend is about 7 percent, based on the total weight of the blend. Test bars molded from this blend have an oxygen index above 27 and a heat distortion temperature about 65° C. which makes this composition excellent for applications wherein a self-extinguishing, high heat distortion temperature article is required.

EXAMPLE 4

Tetrabromophthalic Imide

A blend is prepared to illustrate one embodiment of the second aspect of the invention wherein a self-extinguishing molding composition is produced from a blend of poly(tetramethylene terephthalate) and 3,4,5,6-tetrabromo-N-methylphthalimide.

| Components in Blend | Weight in Grams |
|---|---|
| Poly(tetramethylene terephthalate) | 85 |
| 3,4,5,6-tetrabromo-N-methylphthalimide | 15 |

The amount of bromine in this blend is about 10 percent, based on the weight of the total composition. Articles molded from this blend have an oxygen index of more than 27, and thus are above the self-extinguishing level.

Another blend is prepared to illustrate one embodiment of the second aspect of the invention wherein talc and antimony trioxide are blended with the above materials to produce a molding composition of increased flame retardancy and having a high heat distortion temperature.

| Components in Blend | Weight in Grams |
| --- | --- |
| Poly(tetramethylene terephthalate) | 74 |
| 3,4,5,6-Tetrabromo-N-methylphthalimide | 15 |
| Talc | 8 |
| $Sb_2O_3$ | 3 |

The amount of bromine in the blend is 10 percent, based on the total weight of the blend. This composition has physical properties entirely suitable for molding and articles molded from this composition have an oxygen index above 36, which indicates a flame retardancy well above the self-extinguishing level. The heat distortion temperature of the molded articles is above 65° C. which makes it entirely suitable for high heat distortion temperature applications.

EXAMPLE 5

Bis-tetrabromophthalic Imide

A blend is prepared to illustrate one embodiment of the second aspect o the invention wherein a copolyester of 90 mole percent poly(tetramethylene terephthalate) and 10 mole percent poly(ethylene terephthalate) and a bis-tetrabromophthalic imide are blended to produce a self-extinguishing molding composition.

| Components in Blend | Weight in Grams |
| --- | --- |
| Copolyester | 92.5 |
| N,N'-hexamethylenebis(3,4,5,6 tetrabromophthalimide) | 7.5 |

The amount of bromine in the blend is about 6 percent based on the total weight of the blend. Desirable molding properties and an oxygen index of above 26 indicates that articles molded from this blend are self-extinguishing.

Another blend is prepared to illustrate one embodiment of the second aspect of the invention wherein high heat distortion temperature compositions of increased flame retardancy are provided by blending the above materials with antimony trioxide and talc.

| Components in Blend | Weight in Grams |
| --- | --- |
| Copolyester | 79.5 |
| N,N'-hexamethylenebis(3,4,5,6-tetrabromophthalimide) | 7.5 |
| Talc | 10.0 |
| $Sb_2O_3$ | 3.0 |

The amount of bromine in the blend is about 6 percent based on the total weight of the blend. Physical properties of this blend are suitable for molding and an oxygen index about 30 indicates the molded articles are well above the self-extinguishing level of flame retardancy. Additionally, articles molded from this composition are observed to have heat distortion temperatures above 65° C. which make articles molded from this composition ideal for high heat distortion temperature applications.

Results similar to those obtained in examples 1-5 are obtained when other polyesters are used according to this invention. Specifically, copolyesters of 80 mole percent poly(tetramethylene terephthalate) and 20 mole percent poly(tetramethylene isophthalate) are used as well as copolyesters of 85 mole percent poly(tetramethylene terephthalate) and 15 mole percent poly(tetramethylene adipate).

The invention has been described in detail with particular reference to preferred embodiments thereof, but it will be understood that variations and modifications can be effected within the spirit and scope of the invention.

We claim:

1. A composition moldable into a self-extinguishing article having a heat distortion temperature of at least 65° C., said composition comprising A. a polyester of, based on the total moles of dicarboxylic acid, at least 80 mole percent terephthalic acid and, based on the total moles of diol, at least 80 mole percent 1,4-butanediol,
B. based on the weight of the total composition, from about 5-25 weight percent talc, and
C. a flame retarding additive corresponding to the general formula

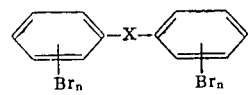

where X is a direct bond, —O—, or

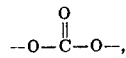

and n is 3, 4, or 5 and mixtures of the above additives, wherein the amount of bromine in total composition is in the range of about 3–12 weight percent.

2. The composition of claim 1 further comprising
D. based on the weight of the total composition about 1–4 weight percent antimony in an antimony containing compound consisting essentially of antimony trioxide.

3. The composition of claim 2 wherein
a. the antimony containing compound is antimony trioxide and the antimony is in the range of 1–3 weight percent,
b. the talc is in the range of 10–15 weight percent, and c. the bromine is in the range of 6–8 percent.

4. A composition moldable into a self-extinguishing article comprising a linear polyester of (1), based on the total moles of dicarboxylic acid, at least 80 mole percent terephthalic acid or an esterifiable derivative thereof, and (2), based on the total moles of diol, at least 80 mole percent 1,4-butanediol, and further comprising a brominated additive selected from the group consisting of
A. tetrabromophthalic anhydride,
B. an ester of tetrabromobisphenol A,
C. a tetrabromophthalic imide corresponding to the general formula

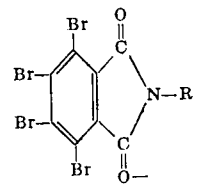

where R is hydrogen or an alkyl group containing from one to four carbon atoms, and
D. a bis-tetrabromophthalic imide corresponding to the general formula

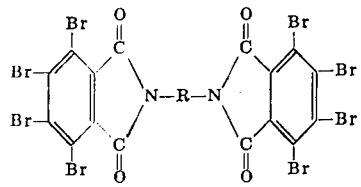

where R is an alkylene group containing from two to ten carbon atoms, and
E. mixtures of at least two of (A), (B), (C), and (D), wherein the bromine comprises from about 3–12 weight percent, based on the total weight of the composition.

5. The composition of claim 4 further comprising, based on the total weight of the composition, about 5–25 weight percent talc.

6. The composition of claim 4 further comprising, based on the weight of the total composition, about 1–4 weight percent antimony in an antimony containing compound consisting essentially of antimony trioxide.

7. The composition of claim 4 where the bromine is in the range of 6–8 weight percent, further comprising, based on the total weight of the composition,
   a. from about 10–15 weight percent talc, and
   b. from about 1–3 weight percent antimony in antimony trioxide.

8. A molded article of the composition of claim 1.
9. A molded article of the composition of claim 4.

UNITED STATES PATENT OFFICE
CERTIFICATE OF CORRECTION

Patent No. 3,624,024    Dated November 30, 1971

Inventor(s) John R. Caldwell and Marvin A. McCall

It is certified that error appears in the above-identified patent and that said Letters Patent are hereby corrected as shown below:

Column 3, line 2, delete "1 5" and insert ---1.5---; Column 3, line 51, delete "in" and insert ---is---; Column 3, lines 68-75, the formula should read as follows

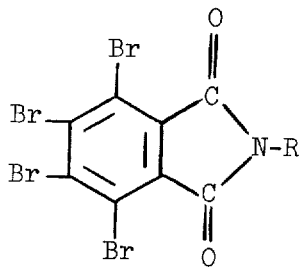

Column 4, Example 1, line 50, after "is prepared" insert ---as a control and a second self-extinguishing blend is prepared---; Column 4, Example 1, in the table, amount of $Sb_2O_3$ for Blend 2 should be ---3.0---; Column 6, Example 3, line 34, delete "retardance" and insert ---retardancy---; Column 6, Example 3, line 47, delete "about" and insert ---above---; Column 7, Example 5, line 23, delete "o" and insert ---of---;

Claim 2, line 31, after "6-8" insert ---weight---; Column 8, Claim 4, lines 43-51, the formula should read as follows

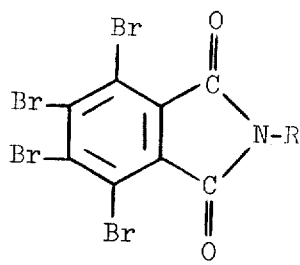

Signed and sealed this 4th day of July 1972.

(SEAL)
Attest:

EDWARD M. FLETCHER, JR.
Attesting Officer

ROBERT GOTTSCHALK
Commissioner of Patents